United States Patent

Colella et al.

Patent Number: 6,122,335
Date of Patent: Sep. 19, 2000

[54] METHOD AND APPARATUS FOR FAST BURST MODE DATA RECOVERY

[75] Inventors: Barry D. Colella, Westford, Mass.; Jeffrey A. Masucci, Windham; Brian Box, Derry, both of N.H.; Lewis W. Farrar, Marblehead, Mass.

[73] Assignee: Quantum Bridge Communications, Inc., North Andover, Mass.

[21] Appl. No.: 09/410,780

[22] Filed: Oct. 1, 1999

[51] Int. Cl.⁷ .................................................. H04L 7/00
[52] U.S. Cl. ........................... 375/355; 375/371; 370/517
[58] Field of Search ................................... 375/355, 371, 375/373, 375; 370/516, 517, 518, 519

[56] References Cited

U.S. PATENT DOCUMENTS

| | | | |
|---|---|---|---|
| 5,022,056 | 6/1991 | Henderson et al. | 375/373 |
| 5,173,899 | 12/1992 | Ballance | 370/108 |
| 5,327,277 | 7/1994 | Van Der Plas et al. | 359/140 |
| 5,398,129 | 3/1995 | Reimann | 359/137 |
| 5,479,451 | 12/1995 | Eldering et al. | 375/343 |
| 5,488,639 | 1/1996 | MacWilliams et al. | 375/355 |
| 5,572,349 | 11/1996 | Hale et al. | 359/137 |
| 5,680,546 | 10/1997 | Chiaretti et al. | 395/200.01 |
| 5,754,535 | 5/1998 | Vandenabeele et al. | 370/321 |
| 5,774,244 | 6/1998 | Tandon et al. | 359/125 |
| 5,818,890 | 10/1998 | Ford et al. | 375/371 |
| 5,822,386 | 10/1998 | Pawelski | 375/373 |
| 5,848,070 | 12/1998 | Durvaux et al. | 370/442 |
| 5,864,413 | 1/1999 | Feldman et al. | 359/125 |
| 5,864,414 | 1/1999 | Barnsley et al. | 359/125 |
| 5,872,645 | 2/1999 | Proctor | 359/136 |
| 5,896,213 | 4/1999 | Nagahori et al. | 359/137 |
| 5,896,474 | 4/1999 | Van Deventer et al. | 385/24 |
| 5,907,587 | 5/1999 | Sokoler | 375/368 |
| 5,926,478 | 7/1999 | Ghaibeh et al. | 370/395 |
| 5,930,018 | 7/1999 | Effenberger | 359/158 |
| 5,930,262 | 7/1999 | Sierens et al. | 370/442 |

FOREIGN PATENT DOCUMENTS 0 889 611 A1   1/1999   European Pat. Off. .

OTHER PUBLICATIONS

Denis J.G. Mestdagh; Fundamentals Of Multiaccess Optical Fiber Networks; ISBN 0–89006; pp. 332–337; 1995.

ITU–T Recommendation G.983.1 "Broadbend Optical Access System Based on Passive Optical Networks (PON)", Oct. 1998.

*Primary Examiner*—Don N. Vo
*Assistant Examiner*—Phuong Phu
*Attorney, Agent, or Firm*—Hamilton, Brook, Smith & Reynolds, PC

[57] ABSTRACT

A method of data recovery includes receiving a data stream of data bits and splitting the data stream to N identical input data streams where N is an integer greater than 1. Each of the N input data streams is delayed with respect to the preceding one by a bit time divided by N. Each of the N delayed input data streams is then sampled using a local clock to provide N samples which form an N-bit sample code per clock period. At least two successive sample codes are decoded to select one of the N delayed input data streams most aligned with the local clock. The selected data stream is thereby retimed to the local clock for synchronous processing of the data stream payload. The local system clock is held constant in the presence of multiple asynchronous data streams for improved robustness in overall system performance.

16 Claims, 3 Drawing Sheets

METHOD AND APPARATUS FOR FAST BURST MODE DATA RECOVERY

BACKGROUND OF THE INVENTION

Many communications networks today provide high bit-rate transport over a shared medium, such as passive optical networks (PON), cable television (CATV) coaxial or hybrid fiber/coax networks, and wireless. These shared medium networks typically use time, frequency or code division multiplexing to transport data signals from a central terminal to several remote customer terminals and time division multiple access (TDMA) to transport data signals from the customer terminals to the central terminal. TDMA is characterized by non-continuous, or burst mode, data transmission.

Traditional clock and data recovery methods are generally optimized for communications systems which receive continuous data streams that have enriched spectra at the sampling frequency. In the case of non-continuous (burst mode) data transmission, the use of a very long preamble or an embedded clock is typically required to allow for data recovery when using traditional clock/data recovery methods. However, both approaches are wasteful of the link bandwidth and are not suited to making very fast (e.g., <20 ns) data recovery decisions.

Other recovery methods sample a known preamble using multiple clock signals having different phases.

SUMMARY OF THE INVENTION

It is desirable to be able to quickly (e.g., <20 ns) recover data from burst mode transmissions without wasting link bandwidth.

Rather than adjusting the local clock to coincide with the data, the approach of the present method and apparatus selects from N incrementally delayed copies of an incoming data stream the data stream that is most aligned with a local clock signal. That is, the local clock is kept fixed and the data is phase and byte aligned to the local clock. The present approach optimizes alignment of the rising edge of the local clock with the center of the bit-time of the data stream.

By splitting the incoming data stream into N identical streams and then delaying each of the streams by multiples of a bit-time/N, several sampling choices are presented simultaneously. These delayed streams are fed into high speed sampling circuits each clocked with the same local oscillator. A logical decode of the now parallel sampled streams is made to determine from at least two bit transitions which of the data streams is the best choice in relation to the local oscillator for recovering the data. The selected data stream is thereby retimed to the local oscillator for synchronous processing of the payload.

With the present approach, link bandwidth is maximized by avoiding the need for a long preamble or an embedded clock, data is recovered rapidly (within 20 ns), and the local system clock is held constant in the presence of multiple asynchronous data streams for improved robustness in overall system performance.

Accordingly, a method of data recovery includes receiving a data stream of data bits and splitting the data stream to N identical input data streams where N is an integer greater than 1. Each of the N input data streams is delayed with respect to the preceding one by a bit time divided by N. Each of the N delayed input data streams is sampled using a local clock to provide N samples which form an N-bit sample code per clock period. At least two successive sample codes are decoded to select one of the N delayed input data streams most aligned with the local clock.

According to an aspect of the method, the received data stream comprises a burst transmission which includes at least two bit transitions which are sampled.

According to another aspect of the method, the decoding includes declaring a sample code valid if the sample code includes at least X consecutive zeroes or ones and if the sample code or adjacent sample codes include at most Y consecutive zeroes and ones, otherwise a sample code is declared invalid. At least two successive valid sample codes are decoded to select the data stream most aligned with the local clock.

According to another aspect, data recovery in a system in which a central terminal and plural remote terminals communicate over a shared medium network includes receiving at the central terminal a data stream of data bits transmitted from one of the plural remote terminals over the shared medium network. The data stream is split to plural identical input data streams each of which is delayed with respect to the preceding one by a time interval less than a bit time. Each of the delayed input data streams is sampled using a local clock to provide samples that form a sample code per clock period. At least two subsequent sample codes are decoded to select one of the plural delayed input data streams most aligned with the local clock.

In accordance with the invention, a data recovery circuit for recovering data bits from a received data stream includes a splitter for splitting the data stream to N identical input data streams and N delay lines each having an input coupled to a corresponding one of the N input data streams. Each delay line delays the corresponding input data stream with respect to the preceding one by a bit time divided by N. The data recovery circuit further includes N samplers each having an input coupled to an output of a corresponding one of the N delay lines. Each sampler samples the corresponding delayed input data stream using a local clock to provide N samples forming an N-bit sample code per clock period. A decoder/selector decodes at least two successive sample codes and selects one of the N delayed input data streams most aligned with the local clock.

The principles of the present invention can be applied to telecommunications, data communications, cable television transmission systems or any other network which uses time division multiple access to transmit narrowband, wideband and broadband services such as data, voice, video, and image.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
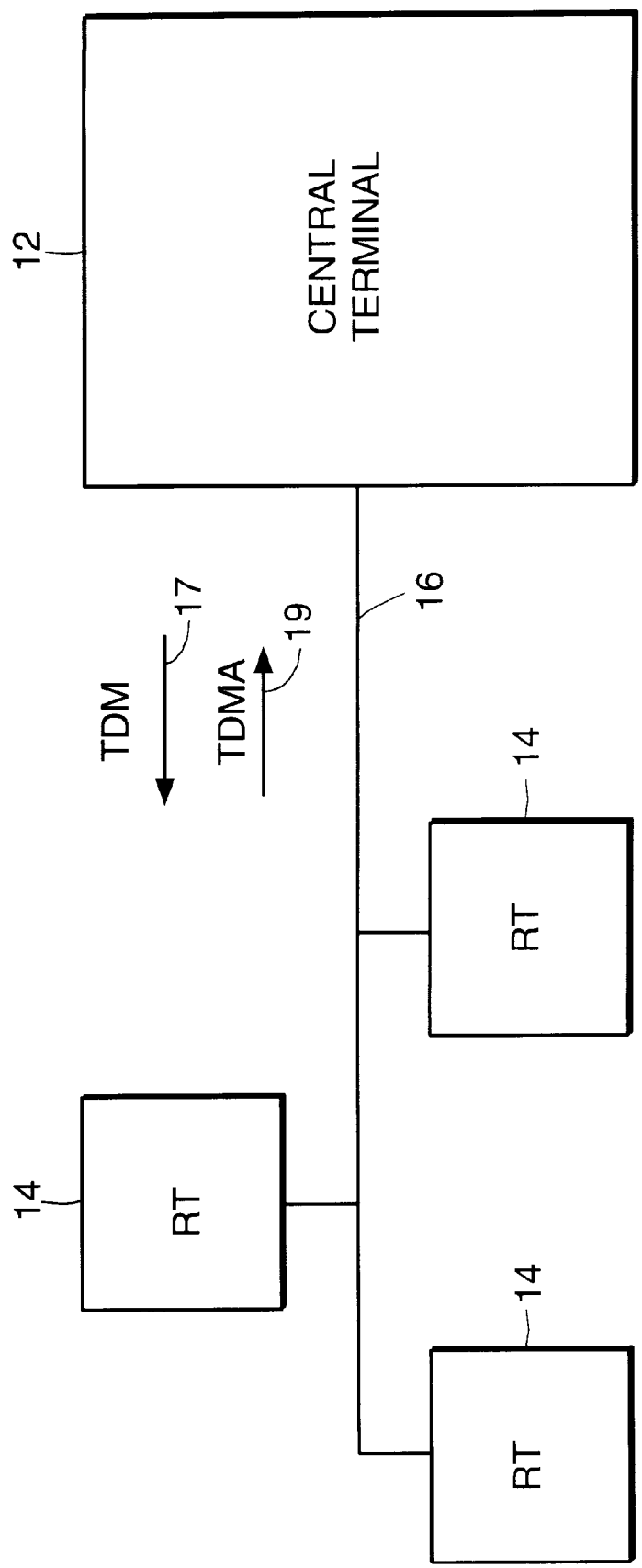
FIG. 1 is a block diagram of a shared medium network.

The principles of the present invention are now described with reference to an embodiment in a passive optical network. However, it should be understood that the principles of the present invention are applicable to other shared medium networks that use burst mode transmission. FIG. 1 shows a block diagram of an optical access system 10 which includes a central terminal 12, remote terminals 14 and a passive optical network (PON) 16. The system 10 provides a downstream data signal 17 over the PON 16 from the central terminal 12 to the remote terminals 14 using time division multiplex (TDM). An upstream data signal 19 from the remote terminals 14 to the central terminal 12 over the PON 16 is provided in burst transmissions using time division multiple access (TDMA).

Note that the terms downstream and upstream are used herein to refer to the direction of transmission signal flow. The downstream direction refers to signals from the central terminal 12 toward the remote terminals 14. The upstream direction refers to signals from the remote terminals 14 toward the central terminal 12.

For a PON system wherein the incoming data frequency is well known and the data bit stream is well behaved over the interval of interest (e.g., duty cycle distortion no worse than 70/30), the present invention applies a novel sampling approach to recover the incoming burst data.

Figure 2:
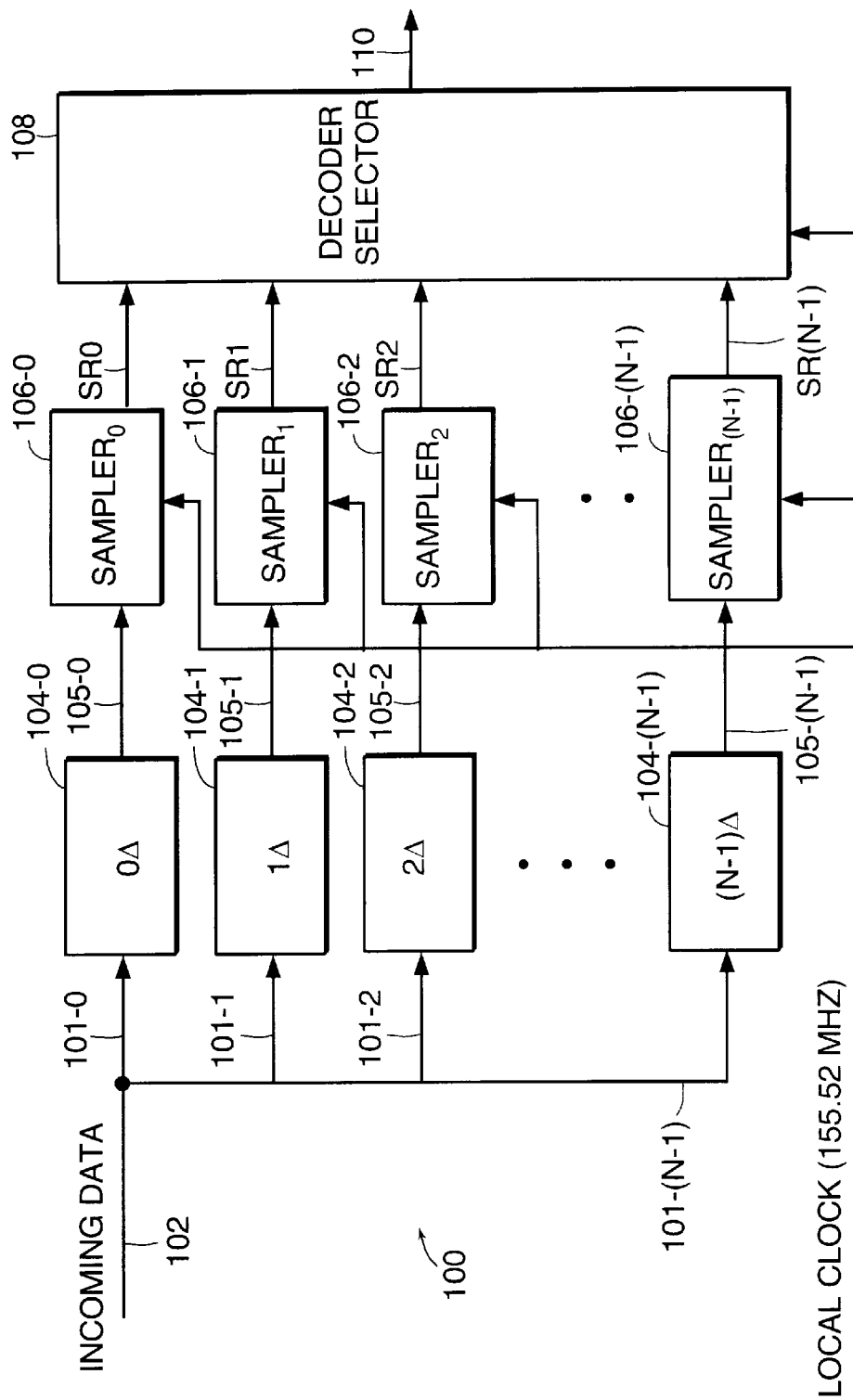
FIG. 2 is a schematic block diagram of a data recovery circuit.

FIG. 2 shows a block diagram of a fast data recovery circuit 100 for use in recovering data from burst transmissions received in central terminal 12 over communications link 16 (FIG. 1). An incoming data stream 102 is received from the link 16 and is split to N identical data streams 101-0, 101-1, 101-2, . . . 101-(N−1). The N identical data streams are input to respective delay lines 104-0, 104-1, 104-2, . . . 104-(N−1) which delay the input data streams by corresponding delays 0Δ, 1Δ, 2Δ, . . . (N−1)Δ where Δ=Bit Time/N. The Bit Time refers to the nominal period or duration expected for each bit in the data stream.

The delayed data streams 105-0, 105-1, 105-2, . . . 105-(N−1) are input to respective data samplers 106-0, 106-1, 106-2, . . . 106-(N−1) which sample and quantize (i.e., 1 and 0 levels) the delayed data streams using a fixed local clock signal 103 to provide N sample streams SR0, SR1, SR2, . . . SR(N−1). For each clock period, an N-bit sample code is formed. As described further herein, a decoder/selector 108 analyzes multiple sample codes to select the data stream which is most aligned with the local clock signal 103. In particular, the decoder/selector optimizes alignment of the rising edge of the local clock 103 with the center of the bit-time of the incoming data stream. The selected data stream is output on line 110 of decoder/selector 108 for subsequent processing using the local clock to recover the data bits of the incoming data stream. The details of such further processing are conventional and are beyond the scope of this invention.

In order to optimize the alignment of the rising edge of the local clock with the center of the bit-time of the incoming data stream, M consecutive sets of N-bit sample codes are decoded to determine which sample stream SR0, SR1, SR2, . . . SR(N−1) is most closely aligned with the local clock. M is at least equal to 2 to correspond to at least two single-bit transitions in the incoming data stream. The N-bit sample codes are first examined for validity. A sample code is valid if it conforms to duty cycle distortion limits specified as follows. First, bit sequences within the sample code must have at least X consecutive zeros or ones to be declared valid where X is determined as a function of M (e.g., if X=2, a "010" pattern within a sample code would result in that sample code being declared invalid since it contains less than X=2 consecutive ones). Second, bit sequences within a sample code or across adjacent sample codes must have no more than Y consecutive zeros or ones where Y is similarly determined as a function of M.

For ease of description, the details of the present decoding and selection method are now described with reference to an example in which N=5, X=3, Y=7 and M=2. Note that with N=5 and M=2, there are 10 sample code bits per decode decision and therefore, X=3, Y=7 correspond to 30 and 70 percent duty cycle distortion limits, respectively.

Figure 3:
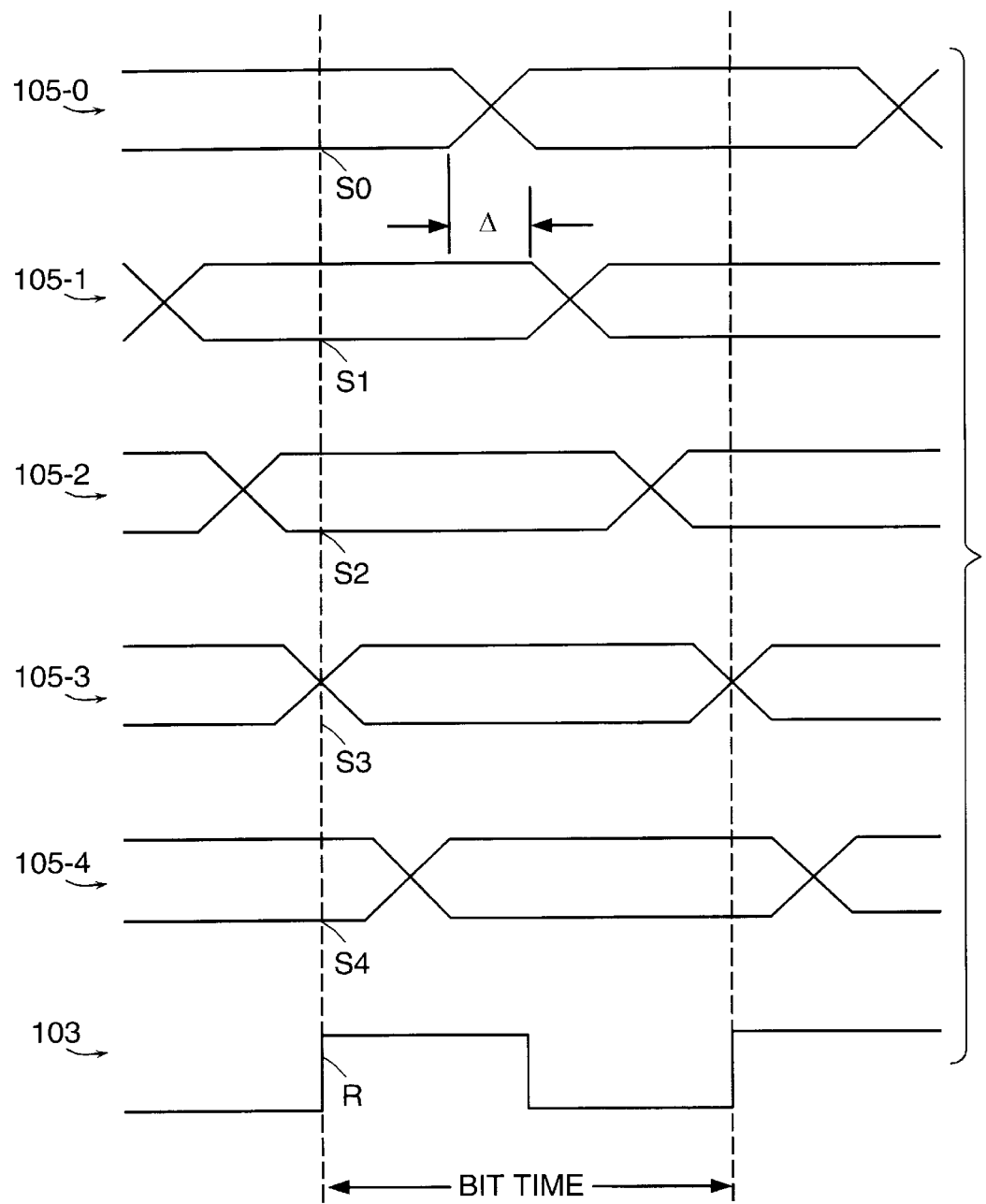
FIG. 3 illustrates delayed data streams in relation to a local clock signal for the circuit of FIG. 2.

Referring to FIG. 3, delayed data streams 105-0, 105-1, 105-2, 105-3, 105-4 for an incoming data stream are shown, with each stream delayed with respect to the preceding one by an amount equal to Δ. Note that the incoming data stream is according to a Non-Return-to-Zero (NRZ) line code, though other line codes can also be recovered. At the rising edge R of local clock signal 103, respective samplers 106-0, 106-1, 106-2, 106-3, 106-4 sample the delayed streams to provide corresponding samples S0, S1, S2, S3, S4 which when quantized form a five-bit sample code.

Table 1 shows the valid sample codes for the example where N=5, X=3, Y=7 and M=2. With these parameter settings, only the 12 sample codes listed in Table 1 are valid out of the 32 possible five-bit sample codes.

TABLE 1

| Valid Sample Codes for N = 5, X = 3, & Y = 7 | |
|---|---|
| Sample code (S0, S1, S2, S3, S4) | Hex value |
| 00000 | 0 |
| 00001 | 1 |
| 00011 | 2 |
| 00111 | 7 |
| 01110 | E |
| 01111 | F |
| 10000 | 10 |
| 10001 | 11 |
| 11000 | 18 |
| 11100 | 1C |
| 11110 | 1E |
| 11111 | 1F |

As noted above, the first sample code is registered and then an additional M−1 consecutive sample codes are likewise received. Each sample code is checked for validity and then the combination of the M sample codes are decoded to make a decision on which sample is most closely phase aligned with the local clock. Table 2 shows several decodes in the ideal case where the incoming data stream has a 50% duty cycle and with N=5, X=3, Y=7 and M=2.

TABLE 2

| "Ideal" Decodes for M = 2 & N = 5 | | |
|---|---|---|
| Sample code 1 | Sample code 2 | Decode decision |
| 00000 | 11111 | SR0 |
| 00001 | 11110 | SR4 |
| 00011 | 11100 | SR3 |
| 00111 | 11000 | SR2 |
| 01111 | 10000 | SR1 |
| 11111 | 00000 | SR0 |

Table 3 shows the valid sample code combinations (i.e., selected from the first column and first row) for an example case where M=2 and N=5 along with the appropriate decode decision for each combination of sample codes. Note that "non-ideal" decode decisions are made based on a probabilistic and empirical analysis of the M sample codes assuming a known L-bit preamble in the data stream of the incoming burst mode transmission. A 4-bit preamble of "1010" provided to the data recovery circuit 100 (FIG. 2) yields the decode decisions depicted in Table 3.

TABLE 3

Example Sample Code Combinations and Associated Decode Decisions (M = 2, N = 5, X = 3, Y = 7); decode decisions = SR0, SR1, SR2, SR3 or SR4, or Error (Err):

|    | 0   | 1   | 3   | 7   | E   | F   | 10  | 11  | 18  | 1C  | 1E  | 1F  |
|----|-----|-----|-----|-----|-----|-----|-----|-----|-----|-----|-----|-----|
| 0  | Err | Err | Err | SR1 | SR1 | SR1 | Err | Err | Err | SR0 | SR0 | SR0 |
| 1  | Err | Err | Err | Err | Err | Err | Err | Err | SR3 | SR4 | SR4 | SR4 |
| 3  | Err | Err | Err | Err | Err | SR2 | SR2 | SR2 | SR3 | SR3 | SR3 | SR4 |
| 7  | SR0 | SR0 | SR1 | Err | Err | Err | SR2 | SR2 | SR2 | SR3 | SR3 | Err |
| E  | SR0 | SR0 | SR0 | SR0 | Err | Err | Err | Err | Err | Err | Err | Err |
| F  | SR0 | SR0 | SR1 | Err | Err | Err | SR1 | SR1 | SR2 | SR2 | Err | Err |
| 10 | Err | Err | SR2 | SR2 | SR1 | SR1 | Err | Err | Err | SR1 | SR0 | SR0 |
| 11 | Err | Err | Err | Err | Err | Err | Err | Err | SR0 | SR0 | SR0 | SR0 |
| 18 | Err | SR3 | SR3 | SR2 | SR2 | SR2 | Err | Err | Err | SR1 | SR0 | SR0 |
| 1C | SR4 | SR3 | SR3 | SR3 | SR2 | SR2 | Err | Err | Err | Err | Err | Err |
| 1E | SR4 | SR4 | SR4 | SR3 | Err | Err | Err | Err | Err | Err | Err | Err |
| 1F | SR0 | SR0 | SR0 | Err | Err | Err | SR1 | SR1 | SR1 | Err | Err | Err |

In order to select the appropriate recovered data stream, L consecutive decode decisions are collected and their results are accumulated to determine the actual decode selection. The rules for valid decodes are summarized in table 4 for the example where L=4. The dashes ("–") in Table 4 indicate any values (i.e., "don't care"). Note that the order of the sample decode decisions does not matter; rather, the combination of decode decisions is analyzed.

TABLE 4

Example Decode Selection for L = 4

| Decode decision 1 | Decode decision 2 | Decode decision 3 | Decode decision 4 | Selected data stream |
|---|---|---|---|---|
| SR0 | SR0 | SR0 | — | SR0 |
| SR1 | SR1 | SR1 | — | SR1 |
| SR2 | SR2 | SR2 | — | SR2 |
| SR3 | SR3 | SR3 | — | SR3 |
| SR4 | SR4 | SR4 | — | SR4 |
| SR0 | SR0 | SR4 | — | SR0 |
| SR1 | SR1 | SR0 | — | SR1 |
| SR2 | SR2 | SR1 | — | SR2 |
| SR3 | SR3 | SR2 | — | SR3 |
| SR4 | SR4 | SR3 | — | SR4 |
| SR0 | SR0 | SR1 | — | SR0 |
| SR1 | SR1 | SR2 | — | SR1 |
| SR2 | SR2 | SR3 | — | SR2 |
| SR3 | SR3 | SR4 | — | SR3 |
| SR4 | SR4 | SR0 | — | SR4 |
| SR0 | SR0 | Err | Err | SR0 |
| SR1 | SR1 | Err | Err | SR1 |
| SR2 | SR2 | Err | Err | SR2 |
| SR3 | SR3 | Err | Err | SR3 |
| SR4 | SR4 | Err | Err | SR4 |
| SR0 | SR1 | SR4 | Err | SR0 |
| SR1 | SR2 | SR0 | Err | SR1 |
| SR2 | SR3 | SR1 | Err | SR2 |
| SR3 | SR4 | SR2 | Err | SR3 |
| SR4 | SR0 | SR3 | Err | SR4 |
| SR4 | SR4 | SR1 | SR1 | SR0 |
| SR0 | SR0 | SR2 | SR2 | SR1 |
| SR1 | SR1 | SR3 | SR3 | SR2 |
| SR2 | SR2 | SR4 | SR4 | SR3 |
| SR3 | SR3 | SR0 | SR0 | SR4 |
| all other decodes invalid for L = 4 | | | | |

Once the appropriate data stream has been selected to align the phase of the incoming data with the local clock, character alignment (e.g., byte alignment) to the local clock must be performed. Such character alignment can be accomplished by delaying the data by K bits (where K≦(number of bits per character)–1) to align a Start of Frame Delimiter (SFD) expected in the incoming data stream with the local clock. Once alignment has been achieved, the selected data stream can be processed synchronously with the local clock. The method for continued recovery and synchronization of the incoming data stream is outside the scope of this patent.

An embodiment of a fast burst mode data recovery circuit provides robust data recovery within less than 20 ns with the parameter settings noted above, namely N=5, X=3, Y=7, M=2 and L=4. It should be understood, however, that robust data recovery can be achieved with varying settings of the noted parameters N, X, Y, M and L.

While this invention has been particularly shown and described with references to preferred embodiments thereof, it will be understood by those skilled in the art that various changes in form and details may be made therein without departing from the scope of the invention encompassed by the appended claims. For example, while the approach described herein provides fast data recovery using a known short preamble, the present principles can be applied to recover data from data streams which do not include a known preamble.

What is claimed is:

1. A method of data recovery comprising:
    receiving a data stream of data bits;
    splitting the data stream to N identical input data streams where N is an integer greater than 1;
    delaying the N input data streams, each of the N input data streams delayed with respect to the preceding one by a bit time divided by N;
    sampling each of the N delayed input data streams using a local clock to provide N samples forming an N-bit sample code per clock period; and
    decoding at least two successive sample codes to select one of the N delayed input data streams most aligned with the local clock.

2. The method of claim 1 wherein the received data stream comprises a burst transmission which includes at least two bit transitions.

3. The method of claim 1 wherein decoding includes declaring a sample code valid if the sample code includes at least X consecutive zeroes or ones and if the sample code or adjacent sample codes include at most Y consecutive zeroes and ones, otherwise declaring a sample code invalid.

4. The method of claim 3 wherein decoding includes decoding at least two successive valid sample codes.

5. The method of claim 1 wherein decoding includes decoding at least two successive sample codes to provide a decode decision and wherein the method further comprises analyzing successive decode decisions to select one of the N delayed input data streams most aligned with the local clock.

6. A method of data recovery in a system wherein a central terminal and plural remote terminals communicate over a shared medium network, the method comprising:

receiving at the central terminal a data stream of data bits transmitted from one of the plural remote terminals over the shared medium network;

splitting the data stream to plural identical input data streams;

delaying the plural input data streams, each of the plural input data streams delayed with respect to the preceding one by a time interval less than a bit time;

sampling each of the plural delayed input data streams using a local clock to provide samples that form a sample code per clock period; and decoding at least two subsequent sample codes to select one of the plural delayed input data streams most aligned with the local clock.

7. The method of claim 6 wherein the received data stream comprises a burst transmission which includes at least two bit transitions.

8. The method of claim 6 wherein decoding includes declaring a sample code valid if the sample code includes at least X consecutive zeroes or ones and if the sample code or adjacent sample codes include at most Y consecutive zeroes and ones, otherwise declaring a sample code invalid.

9. The method of claim 8 wherein decoding includes decoding at least two successive valid sample codes.

10. The method of claim 6 wherein decoding includes decoding at least two successive sample codes to provide a decode decision and wherein the method further comprises analyzing successive decode decisions to select one of the N delayed input data streams most aligned with the local clock.

11. A data recovery circuit for recovering data bits from a received data stream, the circuit comprising:

a splitter for splitting the data stream to N identical input data streams where N is an integer greater than 1;

N delay lines each having an input coupled to a corresponding one of the N input data streams, each delay line delaying the corresponding input data stream with respect to the preceding one by a bit time divided by N;

N samplers each having an input coupled to an output of a corresponding one of the N delay lines, each sampler sampling the corresponding delayed input data stream using a local clock to provide N samples forming an N-bit sample code per clock period; and a decoder for decoding at least two successive sample codes and a selector for selecting one of the N delayed input data streams most aligned with the local clock.

12. The data recovery circuit of claim 11 wherein the received data stream comprises a burst transmission which includes at least two bit transitions.

13. The data recover circuit of claim 11 wherein the decoder declares a sample code valid if the sample code includes at least X consecutive zeroes or ones and if the sample code or adjacent sample codes include at most Y consecutive zeroes and ones, otherwise declaring a sample code invalid.

14. The data recovery circuit of claim 13 wherein the decoder decodes at least two successive valid sample codes.

15. The data recovery circuit of claim 11 wherein the decoder decodes at least two successive sample codes to provide a decode decision and wherein the selector analyzes successive decode decisions to select one of the N delayed input data streams most aligned with the local clock.

16. The data recovery circuit of claim 15 wherein the selector selects one of the N delayed input data streams such that the rising edge of the local clock is most aligned with the center of the bit time of the selected data stream.

* * * * *